United States Patent
Ericson et al.

(10) Patent No.: US 9,568,938 B1
(45) Date of Patent: Feb. 14, 2017

(54) QUICK RELEASE SYSTEM FOR TELESCOPING SUPPORT-JACK-EEZE

(71) Applicants: Chad M. Ericson, New Richmond, WI (US); Andrew J. Heintz, New Richmond, WI (US)

(72) Inventors: Chad M. Ericson, New Richmond, WI (US); Andrew J. Heintz, New Richmond, WI (US)

(*) Notice: Subject to any disclaimer, the term of this patent is extended or adjusted under 35 U.S.C. 154(b) by 0 days.

(21) Appl. No.: 14/809,310

(22) Filed: Jul. 27, 2015

Related U.S. Application Data

(60) Provisional application No. 62/038,889, filed on Aug. 19, 2014.

(51) Int. Cl.
*B60S 9/04* (2006.01)
*G05G 7/00* (2006.01)

(52) U.S. Cl.
CPC ..................................... *G05G 7/00* (2013.01)

(58) Field of Classification Search
CPC .............. G05G 7/00; G05G 7/02; B60S 9/04
USPC ............................................ 74/523; 254/113
See application file for complete search history.

(56) References Cited

U.S. PATENT DOCUMENTS

| | | | | |
|---|---|---|---|---|
| 4,316,601 A * | 2/1982 | Osborne | ............... | A01D 75/20 254/424 |
| 5,626,063 A * | 5/1997 | Kosbab | ................... | B25B 33/00 254/131 |
| 5,984,353 A * | 11/1999 | Rasmussen | .............. | B60S 9/04 188/83 |
| 7,775,542 B1 * | 8/2010 | Watenpaugh | ............. | B60S 9/02 280/475 |
| 8,714,528 B1 * | 5/2014 | Young | ...................... | B60S 9/04 254/419 |
| 2004/0159827 A1 * | 8/2004 | Drake, III | ................ | B60S 9/08 254/425 |

* cited by examiner

*Primary Examiner* — Vicky Johnson
(74) *Attorney, Agent, or Firm* — Tipton L. Randall

(57) ABSTRACT

A quick release assembly has a linear U-shaped member with a base and slotted opposed sides. A nonlinear lever member positioned within the U-shaped member has an aperture aligned with the slots. A fastener through the lever aperture and both slots of the U-shaped member retains the lever member therein. The U-shaped member is fastened to the outer section of a telescoping device parallel with the linear axis thereof. A connector device of the lever member is fastened to a locking mechanism maintaining a movable inner section of the linear telescoping device. Applying force to the lever member opposite the attachment member pivots the lever member and releases the locking mechanism, thereby allowing the inner section of the telescoping device to extend from the outer section, with the lever member attached to the inner section moving along but maintained within the U-shaped member.

14 Claims, 6 Drawing Sheets

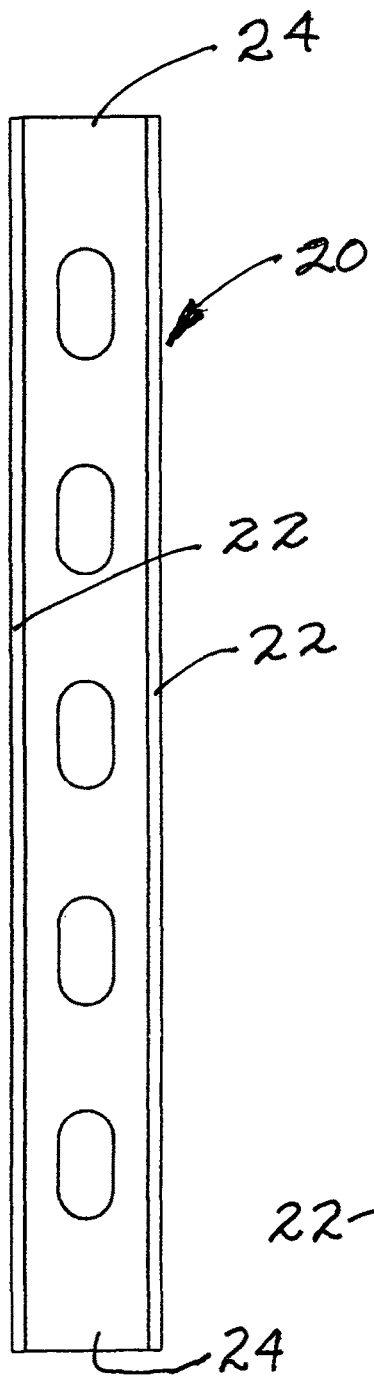
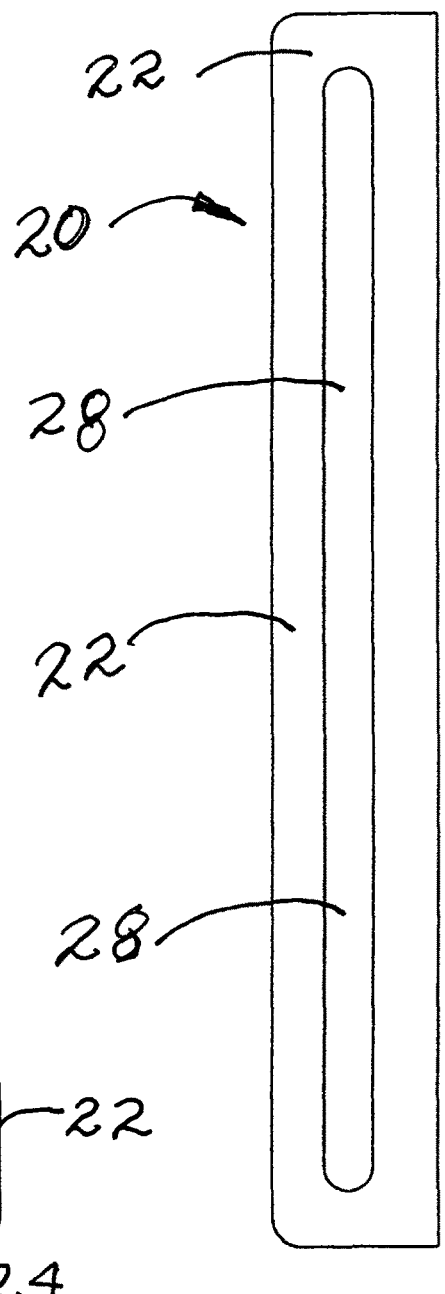
Figure 3  Figure 5  Figure 4

QUICK RELEASE SYSTEM FOR TELESCOPING SUPPORT-JACK-EEZE

CROSS-REFERENCE TO RELATED APPLICATIONS, IF ANY

This application claims the benefit under 35 U.S.C. §119 (e) of provisional application Ser. No. 62/038,889, filed 19 Aug. 2014. Application Ser. No. 62/038,889 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a release system and, more particularly, to a quick release system for a telescoping device and, most particularly, to a quick release system for a telescoping support jack that is used to support one end of a heavy duty trailer.

2. Background Information

Lowboy trailers, for example, are used to move heavy equipment, as well as other heavy loads. The lowboy trailer has one or more rear axles with wheels thereon, with the axle(s) attached to the rear end of the trailer. The bed of the trailer extends forward, with an elevated section having a connecting device used for attachment to a towing vehicle. One feature of the trailer is the ability to be disconnected from the towing vehicle at any desired time. In order to disconnect the trailer from the vehicle, there is provided a pair of supports that attach to the underside of the elevated section having the connecting device. The supports are preferably telescoping in structure so they can be shortened and out of the way when the trailer is connected to a vehicle, and lengthened to contact a support surface when the vehicle is disconnected from the trailer. The telescoping supports also are used on a wide variety of heavy duty trailers to provide support and stability with the trailer at rest, even with the heavy duty trailer attached to a vehicle.

The telescoping supports have multiple nested sections and a locking mechanism that is spring loaded, and can lock the multiple nested sections at any desired length. The spring loaded locking mechanism is unlocked by hand and then the locking mechanism is reengaged to lock the support at the desired level. The spring loaded mechanism requires a heavy duty spring to ensure that the telescoping sections are held in place during travel as well as when the supports are extended to support the attached end of the trailer. The locking and unlocking of the mechanism require significant force and these operations are often time consuming, particularly should the spring mechanism become sticky.

Applicants have devised a quick release mechanism that is useful for quick and easy unlocking of the spring-biased mechanism used with the telescoping support. The invention is an unobvious improvement in the existing technology.

SUMMARY OF THE INVENTION

The invention is directed to a quick release assembly adapted for adjusting the length of a telescoping support device. The quick release assembly comprises a linear U-shaped member of selected length having opposed side sections and a base section there between. The opposed side sections each have mutually aligned linear slots extending parallel with the base section. A nonlinear lever member has first and second exterior sections, with each exterior section connected at a first end to a center section. Each exterior section forms an obtuse angle with the center section. The first exterior section has an aperture therein at the first end thereof adjacent the center section. The nonlinear lever member is sized to fit within the U-shaped member with the aperture therein aligned with the mutually aligned linear slots thereof. A linear fastener member is positioned through the aperture in the lever member and extends through both aligned linear slots of the U-shaped member to movably retain the lever member there within. A connector device is secured to the second end of the first exterior section of the lever member opposite the aperture therein.

The base section of the linear U-shaped member is rigidly fastened to a stationary outer section of a linear telescoping device parallel with the linear axis of the telescoping device. The connector device of the lever member is fastened to a locking mechanism secured to and maintaining a movable inner section of the linear telescoping device at a selected position. Applying force to the second exterior section of the lever member opposite the connector device pivots the lever member on the liner fastener member, thereby releasing the locking mechanism. Unlocking the mechanism allows the inner section of the telescoping device to extend from the outer section thereof, with the lever member attached to the inner section thereof moving along but maintained within the U-shaped member by the fastener.

BRIEF DESCRIPTION OF THE DRAWINGS

FIG. 3 is a front view of the linear U-shaped member of the quick release mechanism of the present invention.

FIG. 4 is a side view of the linear U-shaped member of the quick release mechanism of the present invention.

FIG. 5 is an end view of the linear U-shaped member of the quick release mechanism of the present invention.

DESCRIPTION OF THE EMBODIMENTS

Construction

A quick release assembly adapted for adjusting the length of a telescoping support device. The quick release assembly comprises a linear U-shaped member of selected length having opposed side sections and a base section there between. The opposed side sections each have mutually aligned linear slots extending parallel with the base section. A nonlinear lever member has first and second exterior sections, with each exterior section connected at a first end to a center section. Each exterior section forms an obtuse angle with the center section. The first exterior section has an aperture therein at the first end thereof adjacent the center section. The nonlinear lever member is sized to fit within the U-shaped member with the aperture therein aligned with the mutually aligned linear slots thereof. A linear fastener member is positioned through the aperture in the lever member and extends through both aligned linear slots of the U-shaped member to movably retain the lever member there within. A connector device is secured to the second end of the first exterior section of the lever member opposite the aperture therein.

The base section of the linear U-shaped member is rigidly fastened to a stationary outer section of a linear telescoping device parallel with the linear axis of the telescoping device. The connector device of the lever member is fastened to a locking mechanism secured to and maintaining a movable inner section of the linear telescoping device at a selected position. Applying force to the second exterior section of the lever member opposite the connector device pivots the lever member on the liner fastener member, thereby releasing the locking mechanism. Unlocking the mechanism allows the inner section of the telescoping device to extend from the outer section thereof, with the lever member attached to the inner section thereof moving along but maintained within the U-shaped member by the fastener.

Figure 1:
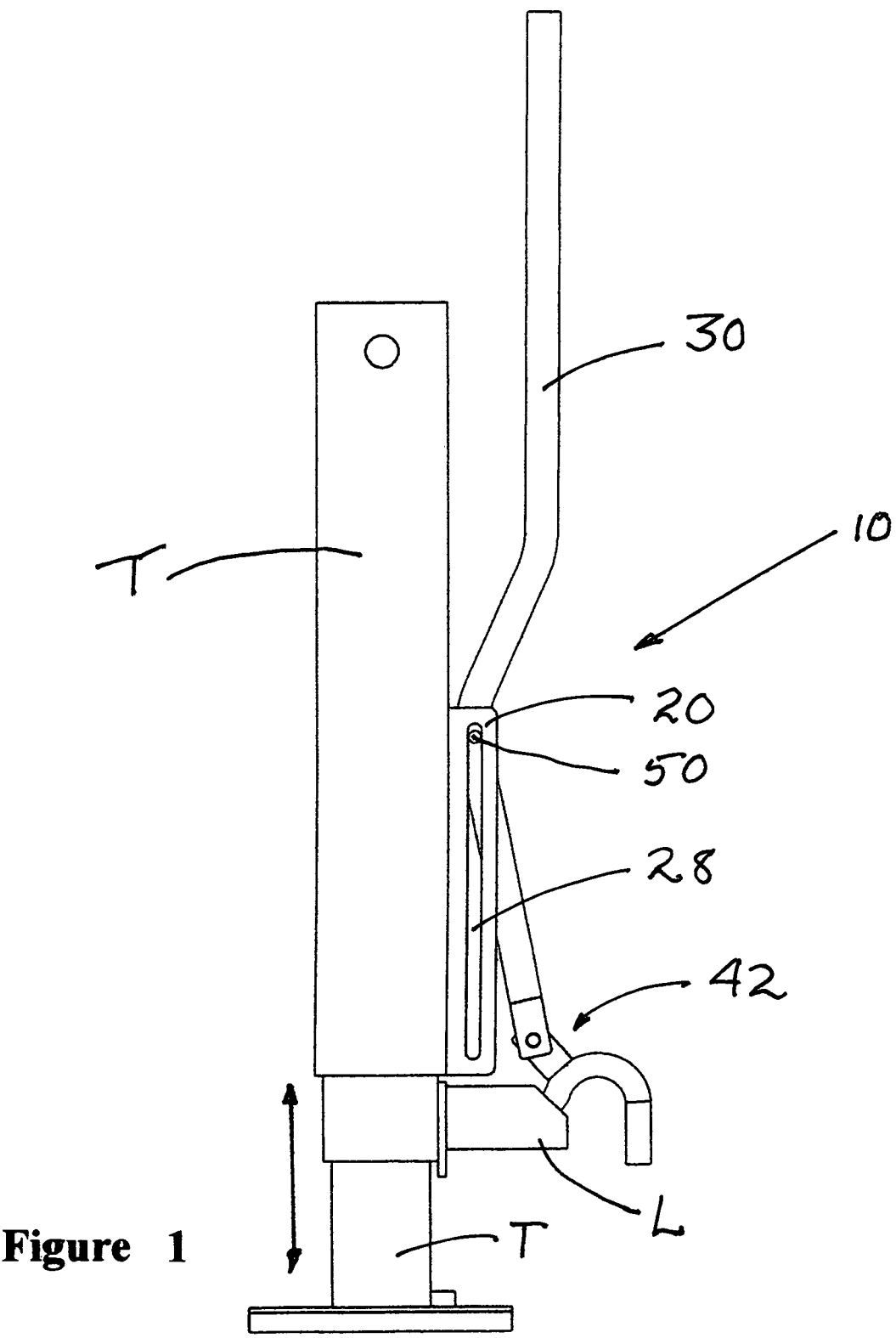
FIG. 1 is a perspective side view of the quick release assembly of the present invention secured to a telescoping support.

Referring now to FIG. 1, a side view of the quick release assembly 10 secured to a telescoping support device T is shown. The linear U-shaped member 20 is secured to the exterior section of the telescoping support device T, while the nonlinear lever member 30 is secured to the locking mechanism L by the connector device 42. A fastener member 50 movably maintains the nonlinear lever member 30 within the linear U-shaped member 20.

Figure 2:
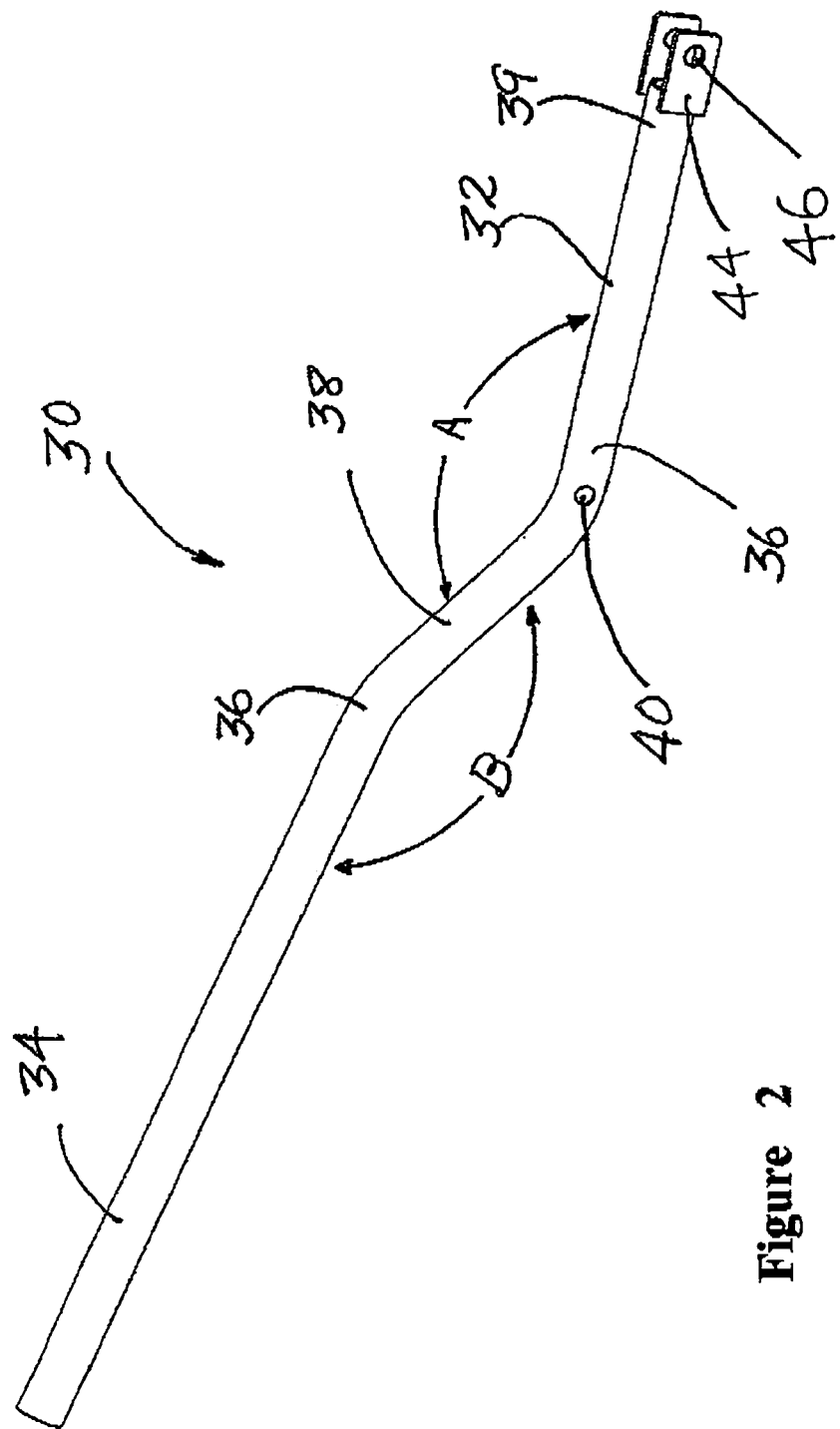
FIG. 2 is a perspective side view of the nonlinear lever member of the quick release mechanism of the present invention.
Figure 6:
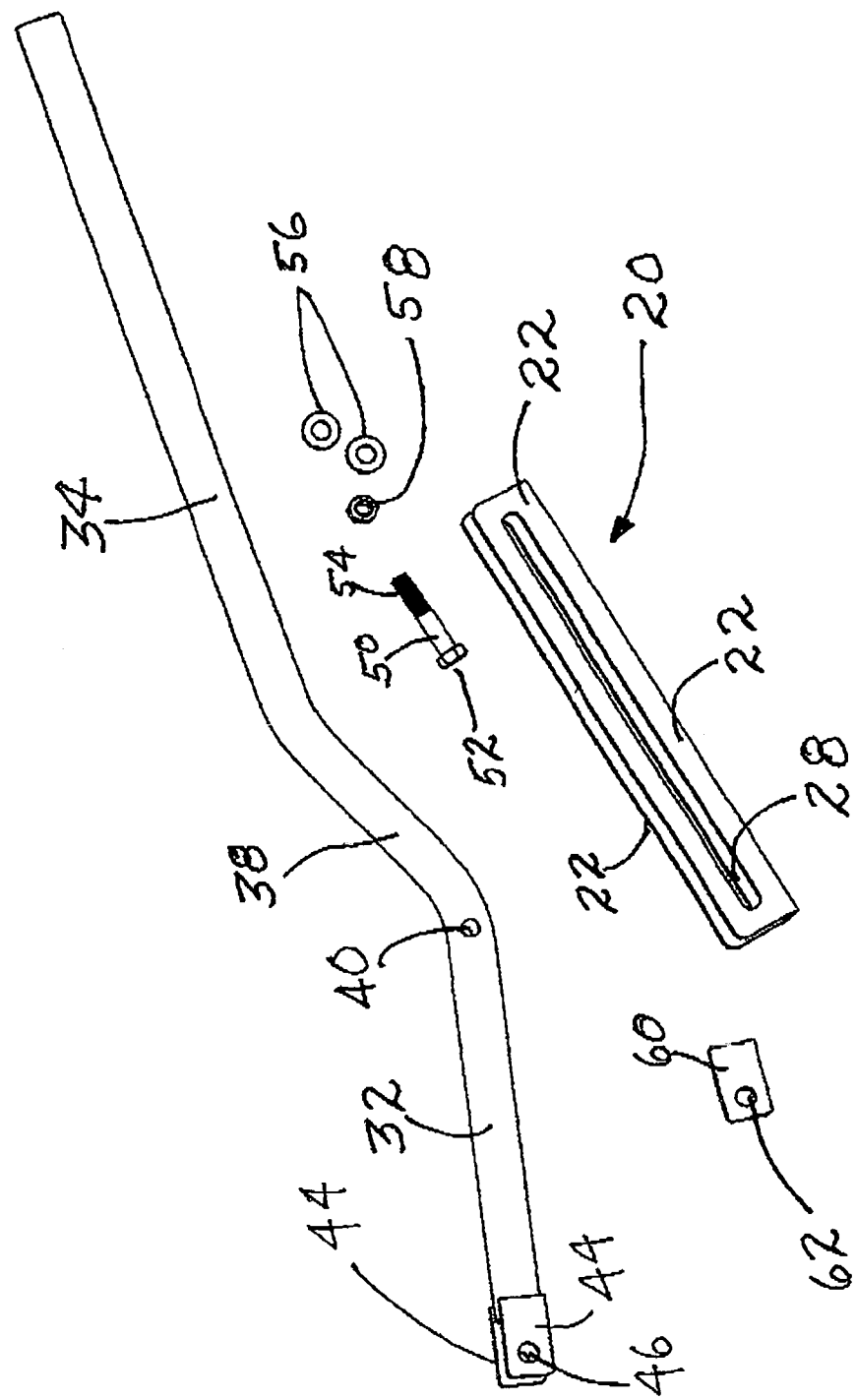
FIG. 6 is a perspective view of the individual unassembled elements of the quick release mechanism of the present invention.

FIGS. 2-6 provide detailed views of the various component elements of the quick release assembly 10. Referring to FIGS. 2 and 6, the nonlinear lever member 30 has a first exterior section 32 and a second exterior section 34, with the exterior sections 32, 34 each connected at a first end 36 to a center section 38. Each of the exterior sections 32, 34 forms an obtuse angle with the center section 38. The obtuse angle is greater than 90 degrees and less than 180 degrees. Preferably, the obtuse angle A between the first exterior section 32 and the center section 38 is 138 degrees. Preferably, the obtuse angle B between the second exterior section 34 and the center section 38 is 154 degrees. The importance of the two angles is discussed below. The first exterior section 32, the second exterior section 34 and the center section 38 of the lever member 30 all lie in a common plane. The first exterior section 32 has an aperture 40 therein at the first end 36 thereof adjacent the center section 38, the axis of the aperture 40 being perpendicular to the common plane of the sections of the lever member 30.

Referring now to FIGS. 3-5, a linear U-shaped member 20 of selected length has opposed side sections 22 and a base section 24 there between. The opposed side sections 22 each have mutually aligned linear slots 28 extending parallel with the base section 24. The liner slots 28 are closed at the ends. The nonlinear lever member 30 is sized to fit within the U-shaped member 20 with the aperture 40 therein aligned with the mutually aligned linear slots 28 thereof. A linear fastener member 50 (FIG. 6) is positioned through the aperture 40 in the lever member 30 and extends through both aligned linear slots 28 of the U-shaped member 20 to movably retain the lever member 30 there within. Preferably, the fastener member 50 is a threaded bolt and nut with washer members 56 to movably maintain the lever member 30 within the U-shaped member 20, although other types of linear fasteners can function comparably well.

Figure 7:
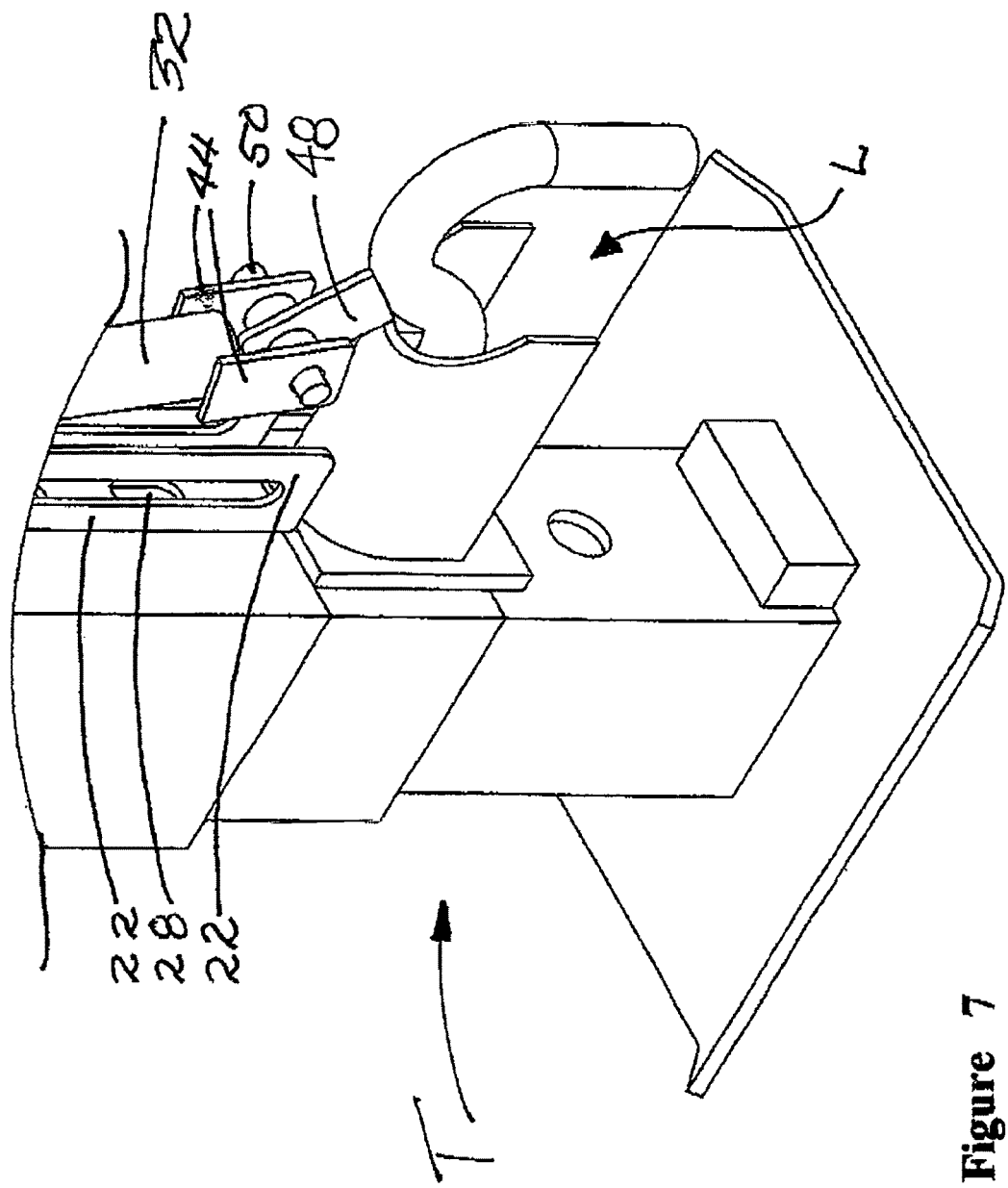
FIG. 7 is a perspective side view of the quick release mechanism of the present invention secured to a telescoping support and to a locking mechanism, with the support retracted from a support surface.
Figure 8:
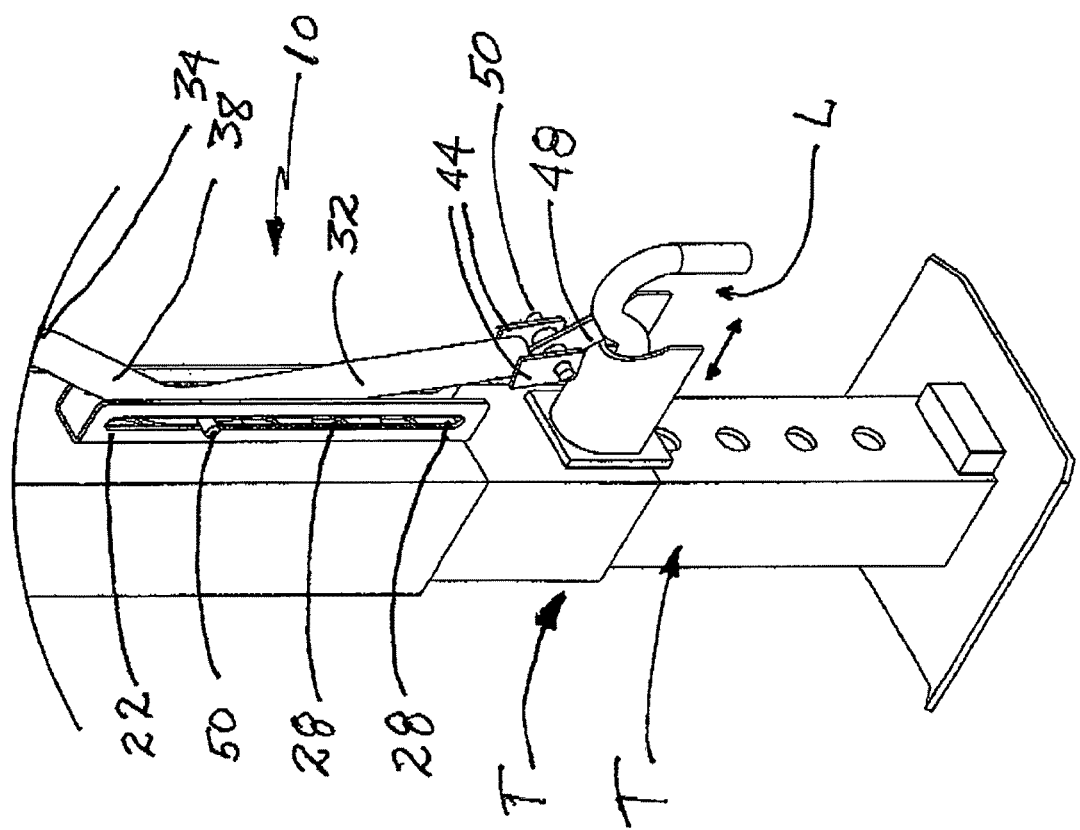
FIG. 8 is a perspective side view of the quick release mechanism of the present invention secured to a telescoping support and to a locking mechanism with the support extended to a support surface.

A connector device 42 is secured to the second end 39 of the first exterior section 32 of the lever member 30. The connector device 42 includes a pair of flanges 44 rigidly secured to the second end 39 of the first exterior section 32 of the lever member 30, the flanges 44 each having an aperture 46 therein, as shown in FIGS. 2 and 6. The connector device 44 also includes an attachment tab 48 with an aperture 49 therein. A second linear fastener member 50 is positioned through each aperture 46 of each flange member 44 and through the aperture 62 in the attachment tab 60 to complete the connector device 42. The connector device 42 is rigidly attached to the locking mechanism L, for example, by a weld there between the attachment tab 60 and the locking mechanism L. The connector device 42 thus connects the locking mechanism L to the second end 39 of the first exterior section 32 of the lever member 30, as shown in FIGS. 7 and 8.

The quick release assembly 10 is mounted on the stationary portion of a telescoping support member T, with the linear U-shaped member 20 parallel with the linear axis thereof, as described earlier. Referring now to FIGS. 7 and 8, operation of the quick release assembly 10 is illustrated. FIGS. 1 and 7 show the telescoping support device T maintained in a raised position by the locking mechanism L. In order to lengthen (or shorten) the telescoping support device T, an individual need only push the second exterior section 34 of the lever member 30 toward the telescoping support device T. The angles A and B of the nonlinear lever member 30 provide easy access by the user. The lever member 30 pivots on the fastener member 50 and the second end 39 of the first exterior section 32 of the lever member 30 moves away from the telescoping support device T and opens the locking mechanism L, thereby allowing the inner tube of the telescoping support device T to move downward. The locking mechanism is spring-biased to maintain the mechanism in the locked condition except when unlocked by pushing on the lever member 30. Because the lever member 30 is secured to the locking mechanism L, the lever member 30 slides down the U-shaped member 20, held in position by the linear fastener member 50 positioned within the linear slots 28 in the U-shaped member 20. Releasing the second exterior section 34 of the lever member 30 allows the locking mechanism L to engage and maintain the telescoping support device T in an extended condition. To shorten the telescoping support device T, the lever member 30 is again pushed to unlock the locking mechanism L, then the inner tube moves upward within the telescoping support device T, and again is locked in place by the locking mechanism L.

While the invention has been particularly shown and described with reference to preferred embodiments thereof, it will be understood by those skilled in the art that various changes in form and details may be made therein without departing from the spirit and scope of the invention.

We claim:

1. A quick release assembly adapted for adjusting the length of a telescoping support device, the quick release assembly comprising;

a linear U-shaped member of selected length having a pair of opposed side sections and a base section there between, the opposed side sections each having a linear slot therein extending parallel with the base section, the linear slots positioned in mutual alignment;

a nonlinear lever member having first and second exterior sections, each exterior section connected at a first end to one end of a linear center section, each exterior section forming an obtuse angle with the center section, the first exterior section having an aperture therein at the first end thereof, the aperture therein adjacent the center section;

the nonlinear lever member sized to fit within the U-shaped member and having the aperture there through aligned with the linear slots of the pair of opposed side sections of the U-shaped member;

a linear fastener member positioned through the aperture in the lever member and extending through both linear slots of the U-shaped member to movably retain the lever member there within; and a connector device secured to a second end of the first exterior section of the lever member opposite the aperture of the first exterior section;

whereby the base section of the linear U-shaped member is rigidly fastened to a stationary outer section of a linear telescoping device parallel with a linear axis of the telescoping device; and the connector device of the lever member is fastened to a locking mechanism secured to and maintaining a movable inner section of the linear telescoping device at a selected position.

2. The quick release assembly adapted for adjusting the length of a telescoping support device of claim 1, wherein the connector device secured to a second end of nonlinear lever member comprises;

a pair of opposed flanges secured to the second end of the first exterior section of the lever member, the flanges each having an aperture therein;

an attachment tab rigidly fastened to the locking mechanism, the attachment tab including an aperture therein; and a second linear fastener member positioned through each aperture of each flange member and though the aperture in the attachment tab, thereby securing the locking mechanism to the second end of the first exterior section of the lever member.

3. The quick release assembly adapted for adjusting the length of a telescoping support device of claim 1 wherein, the first and second exterior sections and the center section of the nonlinear lever member lie in a common plane.

4. The quick release assembly adapted for adjusting the length of a telescoping support device of claim 3 wherein, said common plane is perpendicular to the aperture through the lever member.

5. The quick release assembly adapted for adjusting the length of a telescoping support device of claim 1, wherein the obtuse angle between the first exterior section and the center section of the lever member is 138 degrees.

6. The quick release assembly adapted for adjusting the length of a telescoping support device of claim 1, wherein the obtuse angle between the second exterior section and the center section of the lever member is 154 degrees.

7. A quick release assembly adapted for adjusting the length of a telescoping support device, the quick release assembly comprising;

a linear U-shaped member of selected length having a pair of opposed side sections and a base section there between, the opposed side sections each having a linear slot therein extending parallel with the base section, the linear slots positioned in mutual alignment;

a nonlinear lever member having first and second exterior sections, each exterior section connected at a first end to one end of a linear center section, each exterior section forming an obtuse angle with the center section, the first exterior section having an aperture therein at the first end thereof, the aperture therein adjacent the center section;

the nonlinear lever member sized to fit within the U-shaped member and having the aperture there through aligned with the linear slots of the pair of opposed side sections of the U-shaped member;

a linear fastener member positioned through the aperture in the lever member and extending through both linear slots of the U-shaped member to movably retain the lever member there within; and a connector device secured to a second end of the first exterior section of the lever member opposite the aperture of the first exterior section, the connector device including a pair of opposed flanges secured to the second end of the first exterior section of the lever member, the flanges each having an aperture therein;

an attachment tab rigidly fastened to the locking mechanism, the attachment tab including an aperture therein; and a second linear fastener member positioned through each aperture of each flange member and though the aperture in the attachment tab, thereby securing the locking mechanism to the second end of the first exterior section of the lever member;

whereby the base section of the linear U-shaped member is rigidly fastened to a stationary outer section of a linear telescoping device parallel with a linear axis of the telescoping device; and the connector device of the lever member is fastened to a locking mechanism secured to and maintaining a movable inner section of the linear telescoping device at a selected position.

8. The quick release assembly adapted for adjusting the length of a telescoping support device of claim 7 wherein, the first and second exterior sections and the center section of the nonlinear lever member lie in a common plane.

9. The quick release assembly adapted for adjusting the length of a telescoping support device of claim 8 wherein, said common plane is perpendicular to the aperture through the lever member.

10. The quick release assembly adapted for adjusting the length of a telescoping support device of claim 7, wherein the obtuse angle between the first exterior section and the center section of the lever member is 138 degrees.

11. The quick release assembly adapted for adjusting the length of a telescoping support device of claim 7, wherein the obtuse angle between the second exterior section and the center section of the lever member is 154 degrees.

12. A quick release assembly adapted for adjusting the length of a telescoping support device, the quick release assembly comprising;

a linear U-shaped member of selected length having a pair of opposed side sections and a base section there between, the opposed side sections each having a linear slot therein extending parallel with the base section, the linear slots positioned in mutual alignment;

a nonlinear lever member having first and second exterior sections, each exterior section connected at a first end to one end of a linear center section, each exterior section forming an obtuse angle with the center section, the first exterior section having an aperture therein at the first end thereof, the aperture therein adjacent the center section, the first and second exterior sections and the center section of the nonlinear lever member lying in a common plane, the common plane oriented perpendicular to the aperture through the lever member;

the nonlinear lever member sized to fit within the U-shaped member and having the aperture there through aligned with the linear slots of the pair of opposed side sections of the U-shaped member;

a linear fastener member positioned through the aperture in the lever member and extending through both linear slots of the U-shaped member to movably retain the lever member there within; and a connector device secured to a second end of the first exterior section of the lever member opposite the aperture of the first exterior section, the connector device including a pair of opposed flanges secured to the second end of the first exterior section of the lever member, the flanges each having an aperture therein;

an attachment tab rigidly fastened to the locking mechanism, the attachment tab including an aperture therein; and a second linear fastener member positioned through each aperture of each flange member and though the aperture in the attachment tab, thereby securing the locking mechanism to the second end of the first exterior section of the lever member;

whereby the base section of the linear U-shaped member is rigidly fastened to a stationary outer section of a linear telescoping device parallel with a linear axis of the telescoping device; and the connector device of the lever member is fastened to a locking mechanism secured to and maintaining a movable inner section of the linear telescoping device at a selected position.

13. The quick release assembly adapted for adjusting the length of a telescoping support device of claim 12, wherein, said common plane is perpendicular to the aperture through the lever member.

14. The quick release assembly adapted for adjusting the length of a telescoping support device of claim 12, wherein the obtuse angle between the first exterior section and the center section of the lever member is 138 degrees.

* * * * *